| United States Patent [19] | [11] Patent Number: 4,849,465 |
| Lindvay et al. | [45] Date of Patent: Jul. 18, 1989 |

[54] ALIPHATIC ISOCYANURATE CONTAINING POLYESTER RESINS, METHOD FOR MAKING THE SAME, MAGNET WIRE COATED THEREWITH AND AN ELECTROMAGNETIC DEVICE

[75] Inventors: Michael W. Lindvay, Fort Wayne; Allan R. Knerr, Woodburn, both of Ind.; George H. Sollner, Lansing, Mich.

[73] Assignee: Phelps Dodge Industries, Inc., Fort Wayne, Ind.

[21] Appl. No.: 214,453

[22] Filed: Jul. 1, 1988

[51] Int. Cl.$^4$ .............................................. C08L 75/04
[52] U.S. Cl. ..................... 524/736; 335/296; 428/422.8; 524/741; 525/437; 525/440; 525/504; 528/45; 528/56; 528/279; 528/289
[58] Field of Search ................ 524/736, 741; 335/296; 428/422.8; 525/437, 440, 504; 528/45, 56, 279, 289

*Primary Examiner*—Maurice J. Welsh
*Attorney, Agent, or Firm*—Lundy and Walker

[57] ABSTRACT

A composition of matter comprising the reaction product of a cyanuric acid reactant, an aliphatic vicinal diol reactant and a carboxyl reactant, a method for producing the same, a magnet wire coated therewith and an electromagnetic device utilizing the same.

70 Claims, 8 Drawing Sheets

FIG. 1 THEIC POLYESTER (EXAMPLE 5)

FIG. 3 THEIC POLYESTER DECOMPOSITION PRODUCT (EXAMPLE 7)

THEIC POLYESTER (EXAMPLE 8)

EFFECT OF ETHYLENE GLYCOL AND ADIPIC ACID LEVELS ON CARBON DIOXIDE GENERATION

TRIS(2,3-DIHYDROXYPROPYL) ISOCYANURATE POLYESTER (EXAMPLE 29)

FIG. 7 TRIS(2-HYDROXYPROPYL) ISOCYANURATE POLYESTER (EXAMPLE 30)

ALIPHATIC ISOCYANURATE CONTAINING POLYESTER RESINS, METHOD FOR MAKING THE SAME, MAGNET WIRE COATED THEREWITH AND AN ELECTROMAGNETIC DEVICE

BACKGROUND OF THE INVENTION

The invention is related to polyesters and to methods for making the same and is especially related to such polyesters which are useful as electrical insulation. More particularly, this invention relates to aliphatic isocyanurate modified polyesters and to methods for producing the same and to aliphatic isocyanurate modified polyesters applied as magnet wire insulation.

Tris(2-hydroxyethyl)isocyanurate containing polyesters have been widely used as magnet wire coatings, for example as a base coat under a top coat of a different material. Tris(2-hydroxyethyl)isocyanurate (THEIC) produced separately has been added as a reactant in the polyesterification reaction of the polyesters.

THEIC and other aliphatic isocyanurates have been produced by a variety of methods. THEIC has been produced by reacting cyanuric acid with ethylene oxide and by reacting cyanuric acid with ethylene carbonate. Triglycidyl isocyanurate has been produced by reacting cyanuric acid with epichlorohydrin and by reacting cyanuric acid with glycidol. Tris(2-hydroxypropyl)isocyanurate has been produced by reacting cyanuric acid with propylene oxide. Tris(hydroxymethyl)isocyanurate has been produced by reacting cyanuric acid with formaldehyde. Tris(2-hydroxypropyl) isocyanurate has been produced by reacting cyanuric acid with propylene carbonate.

Aliphatic isocyanurate containing polyesters have alternatively been produced by reacting cyanuric acid with ethylene carbonate in situ with dimethyl terephthalate to produce THEIC polyester and with other components to produce THEIC containing polyesterimides and polyester-amide-imides.

The former procedures for producing the alphatic isocyanurate containing polyesters have the shortcoming of requiring the isocyanurate as a reactant. The latter procedures have the shortcoming that both ethylene carbonate and ethylene oxide react with conventional phenolic solvents such as cresylic acid, phenols, cresols and the like and thus polar, aprotic solvents must be used.

Conventional phenolic solvents, as opposed to polar, aprotic solvents, are preferred in the production of magnet wire for reasons of both utility and cost.

In addition, polar, aprotic solvents can present difficulties in the application of even, consistent, smooth coatings on certain substrates, such as fine wire or base insulation materials or substrates subject to attack by the solvents. Problems have also been experienced in using such solvents with conventional magnet wire towers, because of the extremely high temperatures, which are necessary to expel such solvents from coatings and their tendency to autoignite at such temperatures.

It is therefore highly desirable to provide improved aliphatic isocyanurate containing polyester resins and improved methods for producing the same and improved magnet wire having magnet wire insulation including improved aliphatic isocyanurate containing polyester resins and an improved electomagnetic device.

It is also highly desireable to provide such improved resins and improved methods and improved magnet wire and improved electromagnetic device from reaction solutions having, as a cosolvent, conventional phenolic solvents.

It is also highly desireable to provide such improved resins and improved methods and improved magnet wire and electromagnetic devices, in which such resins are polymerized to useful molecular weight in solvents of moderate polarity.

It is also highly desirable to provide such improved resins and improved methods and improved magnet wire, in which such resins can be provided in solutions having relatively low viscosities and relatively high resin contents.

It is also highly desirable to provide such improved resins and improved methods and improved magnet wire and improved electromagnetic devices in which chemical and electrical properties are acceptably similar to those of conventional polyester resins modified with Tris(2-hydroxyethyl)isocyanurate.

It is finally desirable to provide such improved resins and improved methods and improved magnet wire and improved electromagnetic devices, which have all of the above desired features.

SUMMARY OF THE INVENTION

It is an object of the invention to provide improved aliphatic isocynaurate containing polyester resins and improved methods for producing the same and improved magnet wire having magnet wire insulation including improved aliphatic isocyanurate containing polyester resins and an improved electromagnetic device.

It is another object of the invention to provide such improved resins and improved methods and improved magnet wire and improved electromagnetic devices from reaction solutions having as a cosolvent conventional phenolic solvents.

It is also an object of the invention to provide such improved resins and improved methods and improved magnet wire and improved electromagnetic devices, in which such resins are polymerized to a useful molecular weight in solvents of moderate polarity.

It is also an object of the invention to provide such improved resins and improved methods and improved magnet wire, in which such resins can be provided in solutions having relatively low viscosities and relatively high resin contents.

It is also an object of the invention to provide such improved resins and improved methods and improved magnet wire and electromagnetic devices in which chemical and electrical properties are acceptably similar to those of conventional polyester resins modified with Tris(2-hydroxyethyl)isocyanurate.

It is finally an object of the invention to provide such improved resins and improved methods and improved magnet wire and improved electromagnetic devices, which have all of the above desired features.

In the broader aspects of the invention there is provided a composition of matter comprising the reaction product of a cyanuric acid reactant an aliphatic vicinal diol reactant and a carboxyl reactant, a method for producing the same, and a magnet wire coated therewith and an electromagnetic device having windings of the magnet wire of the invention.

BRIEF DESCRIPTION OF THE DRAWINGS

The above-mentioned and other features and objects of this invention and the manner of obtaining them will become more apparent and the invention itself will be better understood by reference to the following description of an embodiment of the invention taken in conjunction with the accompanying drawings wherein.

DESCRIPTION OF A SPECIFIC EMBODIMENT

Figure 1:
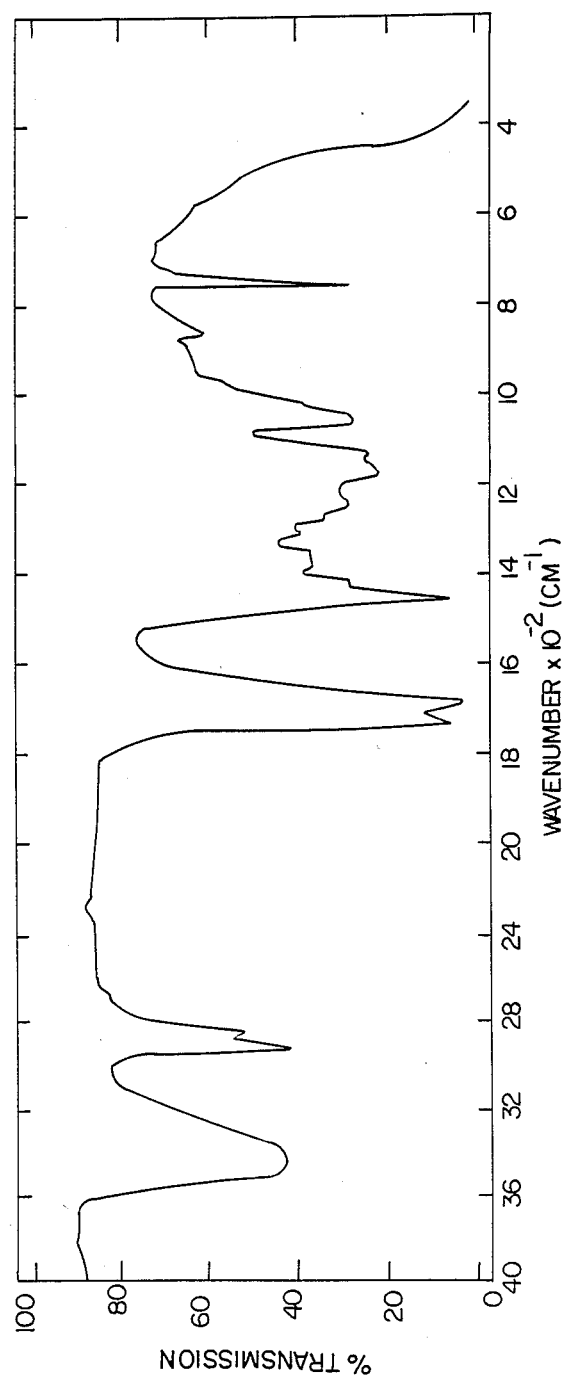
FIG. 1 is an infrared spectra of THEIC polyester of Example 5.
Figure 2:
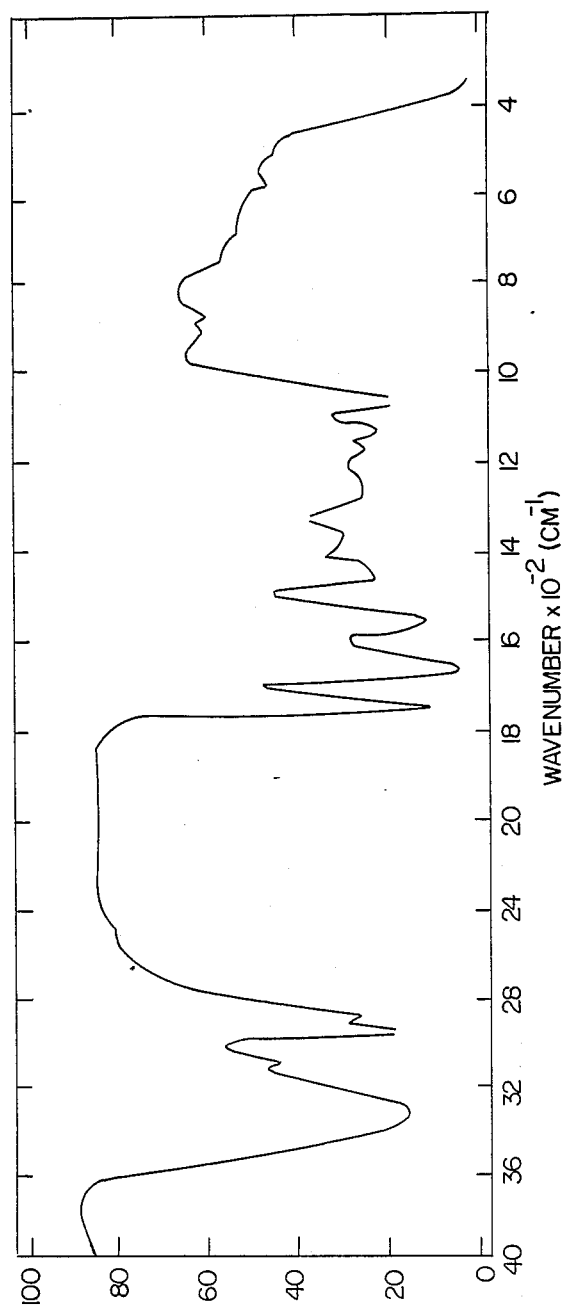
FIG. 2 is an infrared spectra of a THEIC polyester decomposition of Example 6.
Figure 3:
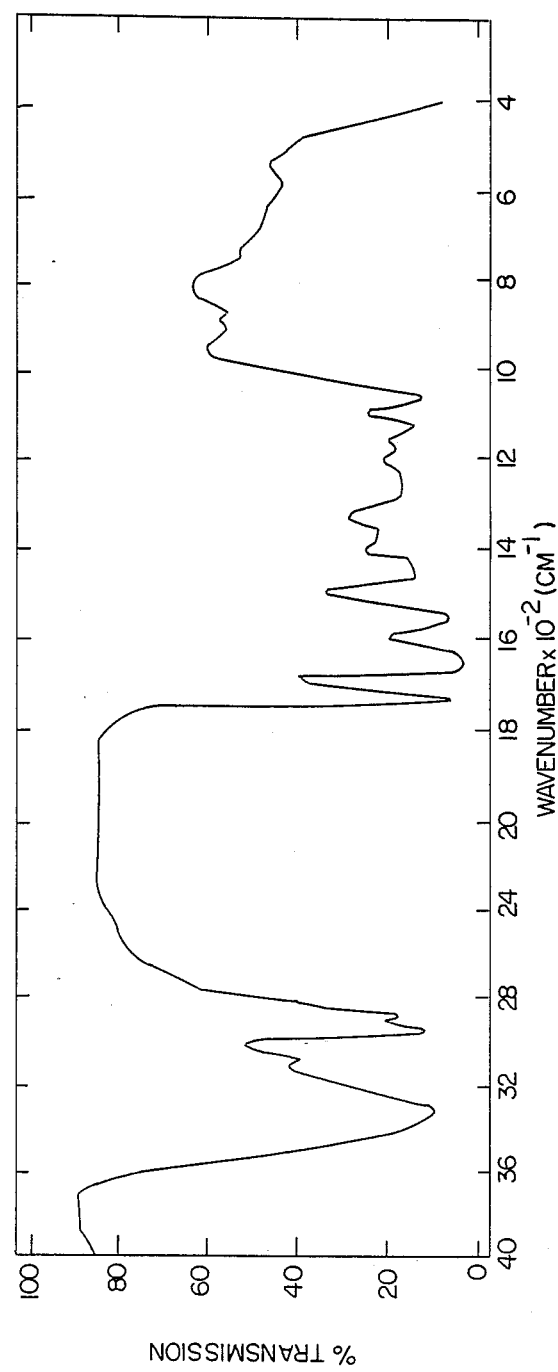
FIG. 3 is an infrared spectra of the THEIC polyester decomposition product of FIG. 7.
Figure 4:
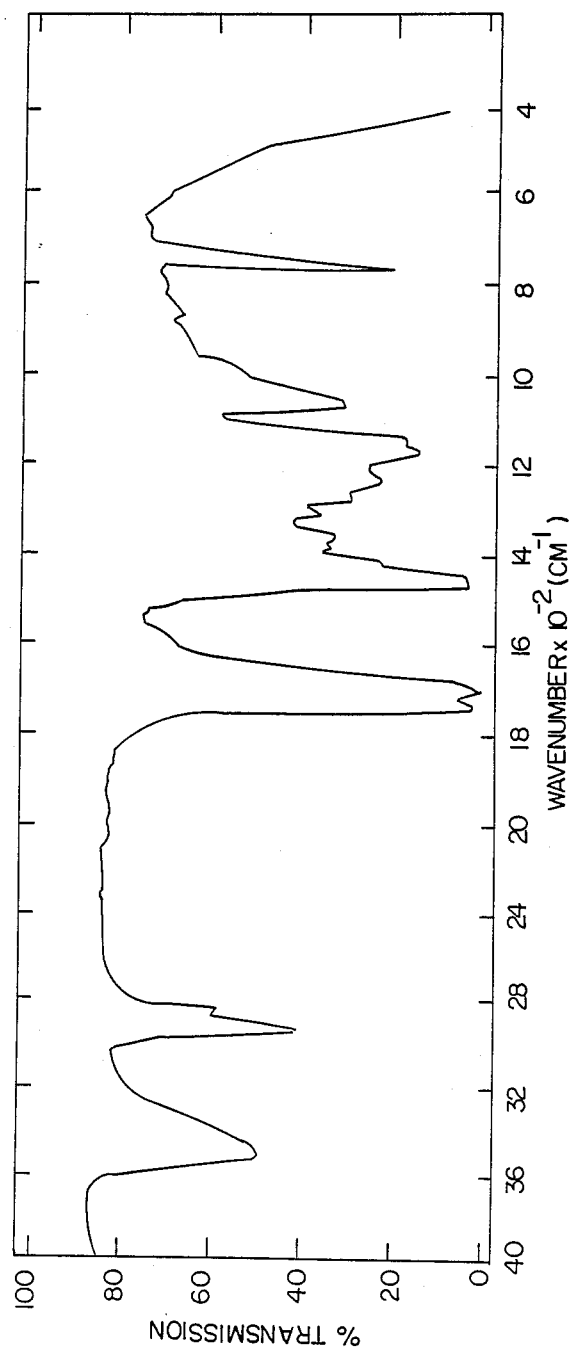
FIG. 4 is an infrared spectra of the THEIC polyester of Example 8.

In accordance with the present invention, polyester resins modified with Tris(2-hydroxyethyl)isocyanurate (THEIC) are formed by reacting a cyanuric acid reactant and an aliphatic vicinal diol reactant in situ with a carboxyl reactant in a cosolvent. The cyanuric acid can also be reacted with the vicinal diol and carboxyl reactants in the form of a preformed polyester. The ratios of cyanuric acid reactant to aliphatic vicinal diol to carboxyl reactant can be varied.

Cyanuric acid or a mono-or-di-aliphatically substituted cyanurate or a combination thereof is suitable as the cyanuric acid reactant. The cyanuric acid reactant may also be produced in situ. For example, urea may be reacted in cresylic acid or other similar solvent to provide a mixture of cyanuric acid in cresylic acid to which other reactants can be added.

Suitable aliphatic vicinal diol reactants useful in the invention, include ethylene glycol, 1,2,propane diol, glycerol, 1,2-butane diol, D-galactose, D-gluconic acid, D-tartaric acid, L-tartaric acid, dimethyl D-tartrate dimethyl L-tartrate.

A portion of the aliphatic diol and carboxyl reactants, may be supplied in the form of preformed polyester resin.

Carboxyl reactants useful in the invention include dicarboxylic acid compounds such as orthophthalic, isophthalic, terephthalic, adipic, azelaic, itaconic, dodecanedioic, pimelic, suberic, and dimerized unsaturated fatty acids. The term "dimerized unsaturated fatty acids" includes dimerized acids and di-acids obtained through polymerization at mid-molecule positions of two monobasic acids. Esters or half-esters of these acids may also be utilized such as dimethyl isophthalate, mono-methyl isophthalate and the like.

The carboxyl reactant may be supplied, in part or in whole, by preformed, essentially linear, polyester resin, such as polyethylene terephthalate and its co-polymers which include a major amount of polyester groups. The preformed resin also supplies aliphatic diol reactant as a radical. The preformed resin may be reacted with diols in accordance with Koerner et al, U.S. Pat. No.3,699,082. It is convenient to react the preformed resin in situ with the reactants of the method of the invention; including sufficient total aliphatic vicinal diol reactant, counting the radical supplied by the preformed resin, to provide an excess over the stoichiometric amount required for the polyesterification reaction.

In accordance with the invention, the cyanuric acid reactant, aliphatic vicinal diol and carboxyl reactant are admixed to form a reaction solution, and then reacted at between about 195° C. and about 225° C. until the reaction mixture is complete and the distillation of reaction byproducts ceases.

The method of the invention provides a process which can be used in conventional, commercial sized equipment to produce a solution of the resin of the invention in solvents such as cresylic acid, phenols, cresols and the like, from which such resins can be applied to substrates. Such solutions may be applied as magnet wire coatings by convential wire coating machinery without the coating problems and autoignition problems experienced when such resins are applied from polar, aprotic solvents. The resins of the invention have chemical and electrical properties similar to those of conventional isocyanurate modified polyesters. The methods of the invention also provide solutions of isocyanurate modified polyester resins having relatively low viscosities and relatively high resin content.

Figure 5:
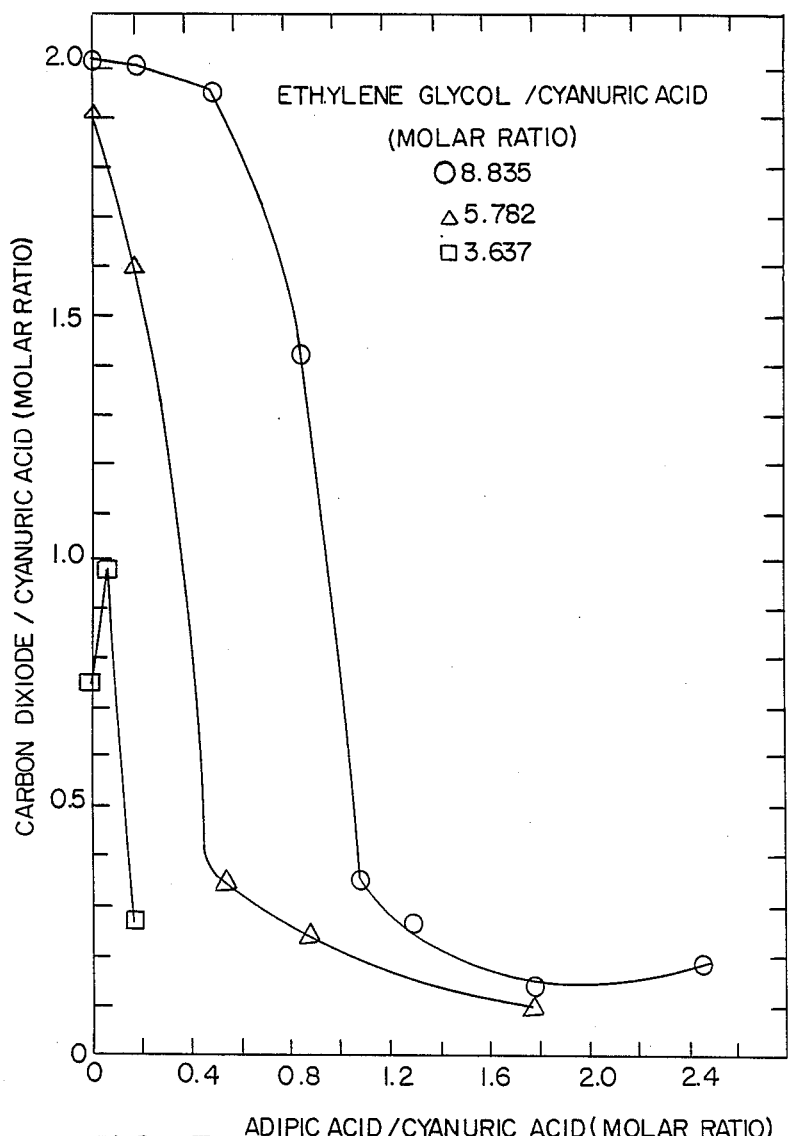
FIG. 5 is a graph of the relationship between carbon dioxide/cyanuric acid to adipic acid/cyanuric acid and ethylene glycol/ cyanuric acid showing the effect of ethylene glycol and adipic acid levels on carbon dioxide generation.

The presence of a carboxyl reactant has been found necessary for the reaction of the method of the invention. Excessive decomposition of cyanuric acid or cyanuric derivatives to carbon dioxide has been found to occur when the carboxyl reactant is not present or low in level. The optimum carboxyl reactant level required is a function of the desired polymer physical properties and the aliphatic vicinal diol level. As can be seen in FIG. 5, the minimum amount of carboxyl reactant required to inhibit $CO_2$ generation is dependant on the amount of diol in the reaction. Desired molar ratios of carboxyl reactant to cyanuric acid reactant are at least about 0.2. Too high a ratio may reduce the desired physical properties of the polymer.

Esterification catalysts are not required, however, esterification catalysts can be employed up to about five weight percent based on the total weight of the polyester resin. Esterification catalysts that can be used include dibutyltin oxide, tetrabutyl titanate, lead oxide, lead acetate, cresyl titanate, and tetrabutyl zirconate.

An advantage of this invention is that cosolvents such as commercial cresylic acid and phenol can be used, instead of polar, aprotic solvents as N-methyl pyrrolidone, dimethyl acetamide, dimethyl formamide, methyl sulfoxide and the like.

The polyester resins of the invention can be modified in the same manner as other isocyanurate containing polyesters. For example, in preparing a polyester resin solution for application as magnet wire insulation, it may be useful to add phenolic resin, polyisocyanate and titanate to the reaction mixture. Phenolic resin may be added in an amount between about 0 and about 15 weight percent, based on total polyester resin. Such a phenolic resin can be prepared from m,p-cresol and formaldehyde. Commercial resins of this type are P.D. George Company's 877 Phenolic and Schenectady Chemical's 710 Phenolic. Polyisocyanate having at least two isocyanate groups blocked with phenol or cresylic acid or other known isocyanate blocking groups in the urethane form be added in an amount between about 0 and about 200 weight percent based on the total polyester resin. A blocked polyisocyanate of this type is Desmodur blocked CT Stabil, available from Mobay Chemical Corporation. Titanate may be added in an amount between about 0 and about 5 weight percent of titanium metal, based on total polyester resin. Cresyl titanate, tetrabutyl titanate and tetraisopropyl titanate are useful titanates for wire enamels. Cresyl titanate may be prepared by adding: to a two liter flask fitted with a motor driven stirrer, reflux condenser, thermocouple and nitrogen flush, Merichem Grade 43 S cresylic acid (380 grams) and tetrabutyl titanate (182 grams) and heating the mixture to 120° C. for 0.5 hours, and cooling the product.

The following examples illustrate the present invention.

EXAMPLES 1-4

Polyesterifications were each performed in a two liter flask fitted with a motor driven stirrer, a fractionating condenser, thermocouple, and nitrogen flush. Cresylic acid (149.0 grams) and ethylene glycol, cyanuric acid or THEIC, terephthalic acid or dimethyl terephthalate, and dibutyl tin oxide were added to the flask. Amounts of reactants are indicated in Table 1. The temperature of the reaction mixture was brought to 195° C. quickly, then slowly raised to 220 C. The polyesterification continued at 220° C. until the reaction was complete and the distillation of reaction byproducts ceased. The reaction mass was then cooled, while adding cresylic acid (72.9 grams) and phenol. CT Stabil was added at 120° C. Aromatic solvent (SC#150 and SC#100 as sold by Hoosier Solvents and Chemicals Corp.) was added after the CT Stabil dissolved. 877 phenolic was added at 60° C. Cresyl titanate was added at 50° C. The reaction mass was mixed until homogenous, then filtered through a filter rated for one micron pore size. The wire enamel was coated in seven passes on 18 AWG (40.0-40.2 mil) copper wire to a build of 2.8-3.3 mils, through a two zone oven (bottom zone, 525° F., top zone, 775° F.). Table II lists the properties of the magnet wire.

The properties of the isocyanurate containing polyester magnet wire insulation of the examples which utilized cyanuric acid are acceptably similar to those of the examples which utilized THEIC.

EXAMPLES 5-8

Polyesterifications were each performed in a 250 milliliter flask fitted with a fractionating condenser, thermocouple, magnetic stirbar, and nitrogen flush. Ethylene glycol; cyanuric acid, THEIC, or THEIC and cresylic acid; adipic acid; and dibutyl tin oxide were added to the flask. The temperature of the reaction was held at 195° C for fifteen hours, then at 210° C. for five hours. The reaction mixture was then cooled and filtered. The gases from the reaction were led through 1.0 N sulfuric acid gas traps, then through six barium hydroxide gas traps.

The volatile basic compound equivalents were determined by back titration of the sulfuric acid solution with 0.1 N potassium hydroxide. The carbon dioxide generated was determined gravimetrically based on barium carbonate formation. The results are presented in Table III.

The resin solutions were applied as films and baked 0.5 hours at 150° C. on potassium chloride. Infrared spectra taken of the films are illustrated in FIGS. 1-4. Infrared absorption spectra of Examples 5 and 8 are similar, verifying the manufacture of a THEIC polyester from cyanuric acid and ethylene glycol.

The formation of THEIC is verified by the presence of bands at 1700 to 1680 cm-1 and at 770 to 760 cm-1 in the infrared spectra. In Examples 6 and 7, those bands are absent from the spectra and 3 moles of carbon dioxide per mole of THEIC were formed.

It is extremely surprising that good conversion to THEIC containing polyester is obtained, under reaction conditions including excess ethylene glycol, which caused the observed degradation of THEIC to carbon dioxide. The production of THEIC containing polyesters by the method of the invention is also surprising in light of the known rearrangement of aliphatic isocyanurates to 2-oxazolidone-type products, which degrade into aziridine-type products, (M.E. Dyen et al, Chem Rev., 67,197 (1967); E.D. Little et al, U.S. Pat. No. 3,108,115; S. Sonnerskog, Acta. Chem. Scand., 10, 467 (1956)). In Examples 6 and 7, THEIC underwent severe decomposition to form 3 moles of carbon dioxide per mole THEIC in the presence of excess ethylene glycol.

EXAMPLES 9-24

Polyesterifications were performed in a 250 milliliter flask fitted with a fractionating condenser, thermocouple, magnetic stirbar, and nitrogen flush. Ethylene glycol, cyanuric acid, and adipic acid were added to the flask in the ratios indicated in Table IV. Dibutyl tin oxide was added as 0.0078 weight percent of the cyanuric acid. The reaction temperature was held at 195° C. for fifteen hours, then at 210° C. for five hours. The reaction mixture was then cooled and filtered. The gases from the reaction were led through two 1.0N sulfuric acid gas traps, then six barium hydroxide gas traps. The volatile basic compound equivalents were determined by back titration of the sulfuric acid solution with 0.1N potassium hydroxide. The carbon dioxide generated was determined gravimetrically based on barium carbonate formation.

As can be seen in Table IV, the decomposition products increase as the ethylene glycol level increases and the adipic acid level decreases. Infrared absorption spectra were taken after the resin solutions were applied as films and baked 0.5 hours at 150° C. on potassium chloride. The spectra indicated that cyanuric acid decomposed quickly when no adipic acid was present. As the adipic acid level was increased, the stability of cyanuric acid and isocyanurate derivative was increased such that a good conversion of cyanuric acid to THEIC was obtained. These results are illustrated in FIG. 5. It is observed that good conversion to THEIC polyester is obtained below the carbon dioxide/cyanuric acid molar ratio of about 0.3. Above the carbon dioxide/cyanuric acid molar ratio of about 0.3, decomposition products become the major products with large amounts of carbon dioxide evolving and a low conversion to THEIC.

FIG. 5 shows quite clearly how the degree of decomposition is a function of ethylene glycol/cyanuric acid molar ratio and is dependent on the presence of the dicarboxylic acid. At an ethylene glycol/cyanuric acid molar ratio of 8.835, about a 1.10 molar ratio of adipic acid/cyanuric acid is required to attain stability of the THEIC polyester. At an ethylene glycol/cyanuric acid ratio of 5.782, about 0.54 molar ratio of adipic acid/- cyanuric acid is required to attain stability of the THEIC polyester. At an ethylene glycol/cyanuric acid molar ratio of 3.637, about a 0.18 molar ratio of adipic acid/cyanuric acid is required to attain stability of the THEIC polyester. Other aliphatic vicinal diol reactants and other carboxyl reactants can be used with changes in the catalyst and reaction conditions and similar families of curves can be prepared.

EXAMPLE 25

The polyesterification was performed in 250 milliliter flask fitted with a fractionating condenser, thermocouple, magnetic stirbar, and nitrogen flush. Ethylene glycol (0.438 moles), cyanuric acid (0.050 moles) and adipic acid (0.088 moles) were added to the flask. The reaction temperature was held at 195° C. for fifteen hours, then at 210° C. for five hours. The reaction mixture was then cooled and filtered. The gases from the reaction were led through two 1.0N sulfuric acid gas traps, then six barium hydroxide gas traps. The volatile basic compound equivalents were determined by back titration of the sulfuric acid solution with 0.1N potassium hydroxide. The carbon dioxide generated was determined gravimetrically based on barium carbonate formation. The carbon dioxide generated amounted to 0.00812 mole and volatile basic compound amounted to 0.00938 equivalents.

In Example 25, the manufacture of THEIC polyester proceeded smoothly without the presence of catalyst and essentially matched the properties of the THEIC polyester of Example 5.

EXAMPLE 26

The esterification was attempted in a 250 milliliter flask fitted with a fractionating condenser, thermocouple, magnetic stirbar, and nitrogen flush. 2-hydroxyethyl ether (38.6 grams,0.364 moles), cyanuric acid (12.9 grams,0.100 moles) and dibutyltin oxide were added to the flask. The gases from the reaction were led through two 1.0 N sulfuric acid gas traps, then six barium hydroxide gas traps. The reaction temperature was held at 195° C. for fifteen hours, then at 210° C. for five hours.

The product was then filtered. The filtrate was applied as a film and baked 0.5 hours at 150 C. on potassium chloride. Infrared spectra, taken of the films, did not show an aliphatic isocyanurate band at 1700-1680 cm-1 but did show bands at 1745 cm-1 and 1262 cm-1 indicating the presence of the carbonate of 2-hydroxyethyl ether. The filtered solid was cyanuric acid (10.1 grams, 0.0782 moles, 78.2% of starting material.

The volatile basic compound equivalents were determined by back titration of the sulfuric acid solution with 0.1N potassium hydroxide. The carbon dioxide generated was determined gravimetrically based on barium carbonate formation. The carbon dioxide generated amounted to 0.00505 mole and volatile basic reaction product amounted to 0.0136 equivalents.

The results indicate that significant conversion to aliphatic isocyanurate did not occur. Only 20% of the cyanuric acid reacted and the carbonate was produced. This indicates the reaction of cyanuric acid is specific for vicinal diols which makes the method of the invention even more surprising.

EXAMPLE 27

The esterification was attempted in a 250 milliliter flask fitted with a fractionating condenser, thermocouple, magnetic stirbar, and nitrogen flush. Catechol (48.2 grams, 0.438 moles), cyanuric acid (6.4 grams, 0.0496 moles) and dibutyl tin oxide (0.050 grams) were added to the flask. The gases from the reaction were led through two 1.0N sulfuric acid gas traps, then six barium hydroxide gas traps. The reaction temperature was held at 195° C. for fifteen hours, then at 210° C. for five hours. Merichem Grade 43S cresylic acid (50 grams) was then added. The product was then filtered and washed with ethanol. The filtered solid was cyanuric acid (5.70 grams, 0.0442 moles, 89.1% recovery of starting material). The volatile basic compound equivalents were determined by back titration of the sulfuric acid solution with 0.1N potassium hydroxide. The carbon dioxide generated was determined gravimetricallly based on barium carbonate formation. The carbon dioxide generated amounted to 0.00101 mole and volatile basic compound amounted to 0.00110 equivalents.

Only very slight decomposition of cyanuric acid was seen in this example where catechol was used in place of aliphatic vicinal diol, re-emphasizing the specificity of the cyanuric acid reaction with aliphatic vicinal diol.

EXAMPLE 28

The polyesterification was attempted in a 250 milliliter flask fitted with a fractionating condenser, thermocouple, magnetic stirbar, and nitrogen flush. 2-ethyl-2-hydroxymethyl-1,3propanediol (82.1 grams, 0.612 moles) cyanuric acid (19.2 grams, 0.149 moles) and adipic acid (38.4 grams, 0.263 moles)and dibutyltin oxide (0.15 grams) were added to the flask. The gases from the reaction were led through two 1.0N sulfuric acid gas traps, then six barium hydroxide gas traps. The reaction temperature was held at 195° C. for 1.5 hours, then at 220° C. for six hours. Merichem Grade 43 cresylic acid was added and the product was filtered. The filtered solid was applied as a film and baked 0.5 hours at 150° C. on potassium chloride. Infrared spectra taken of the films did not show an aliphatic isocyanurate band at 1700-1680 cm-1. The filtrate was cyanuric acid (14.5 grams 0.112 moles, 75.5% recovery of starting material). The volatile basic compound equivalents were determined by back titration of the sulfuric acid solution with 0.1 N potassium hydroxide. The carbon dioxide generated was determined gravimetrically based on barium carbonate formation. The carbon dioxide generated amounted to 0.02765 mole and volatile basic compound amounted to 0.0195 equivalents.

These results indicate some slight decomposition of cyanuric acid to carbon dioxide. This example again shows the necessity of aliphatic vicinal diols as a requirement for efficient reaction with cyanuric acid.

EXAMPLE 29

Figure 6:
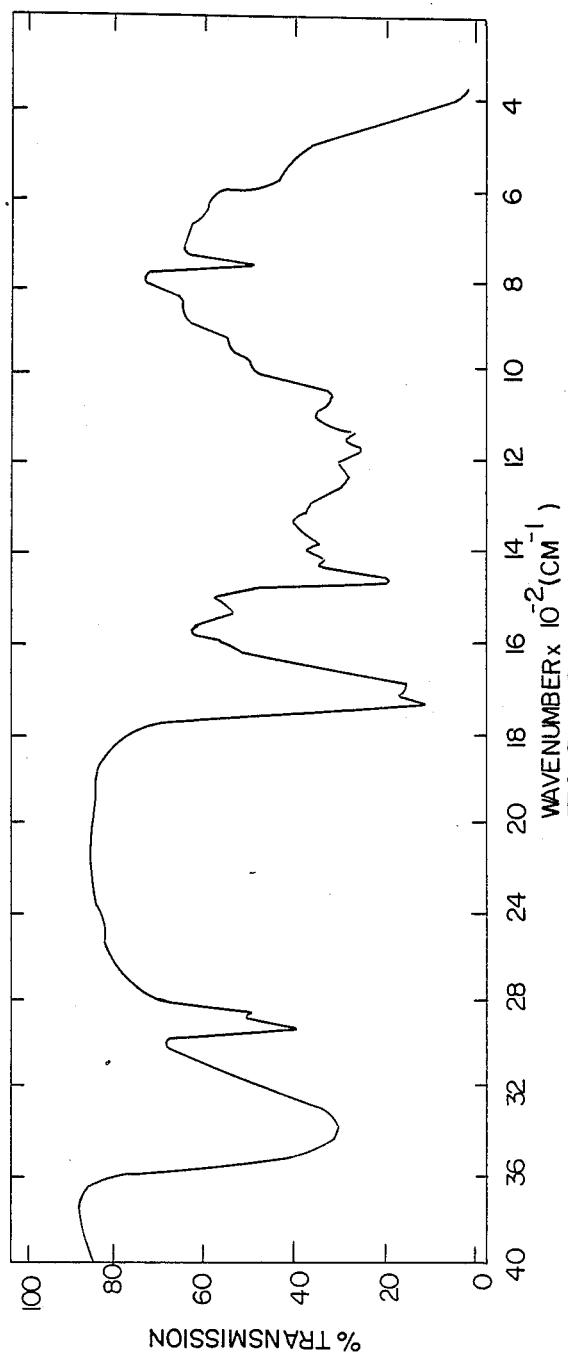
FIG. 6 is an infrared spectra of the tris(2,3-hydroxypropyl) isocyanurate polyester of Example 29.

The polyesterification was performed in a 250 milliliter flask fitted with a fractionating condenser, thermocouple, magnetic stirbar, and nitrogen flush. Merichem Grade 43S cresylic acid (22.5 grams), glycerol (56.4 grams, 0.612 moles), cyanuric acid (19.2 grams 0.149 moles) adipic aid (38.4 grams, 0.263 moles) and tetrabutyltitanate (0.09 grams) were added to the flask. The gases from the reaction were led through two 1.0 N sulfuric acid gas traps, then six barium hydroxide gas traps. The reaction temperature was held at 195° C. for 14.5 hours, then at 220° C. for 3.5 hours. The reaction product was filtered and applied as a film and baked 0.5 hours at 150 C on potassium chloride. Infrared spectra (For example see FIG. 6) taken of the films show aliphatic isocyanurate bands at 1695 cm-1 and 768 cm-1. The volatile basic compound equivalents were determined by back titration of the sulfuric acid solution with 0.1N potassium hydroxide. The carbon dioxide generated was determined gravimetrically based on barium carbonate formation. The carbon dioxide generated amounted to 0.0927 mole and volatile basic compound amounted to 0.0324 equivalents.

The results indicate production of an isocyanurate modified polyester; however, significant decomposition of isocyanurate to carbon dioxide also occurred.

EXAMPLE 30

Figure 7:
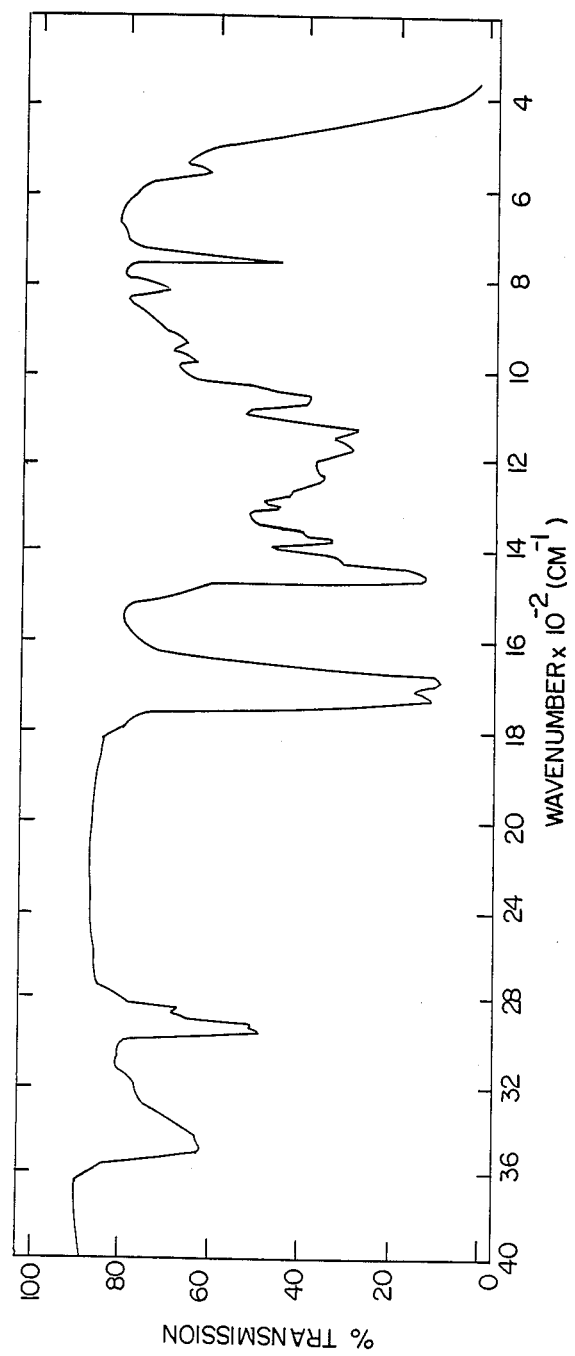
FIG. 7 is an infrared spectra of the tris(2-hydroxypropyl) isocyanurate polyester of Example 30.
Figure 8:
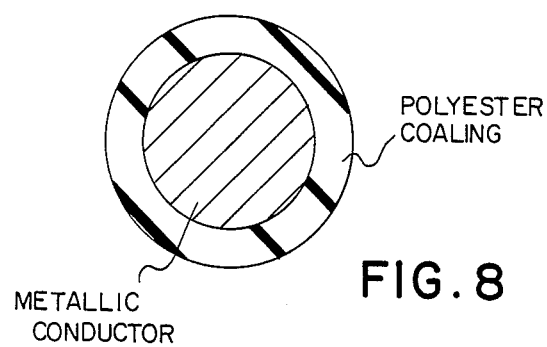
FIG. 8 is a cross-sectional view of the magnet wire of the invention.
Figure 9:
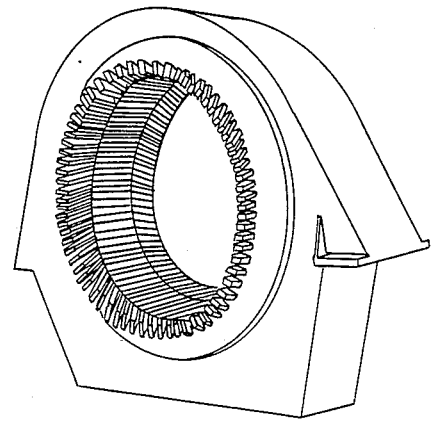
FIG. 9 is a perspective view of an electromagnetic device incorporating the magnet wire of the invention.

The polyesterification was performed in a 250 milliliter flask fitted with a fractionating condenser, thermocouple, magnetic stirbar, and nitrogen flush. Merichem Grade 43 cresylic acid (22.5 grams), 1,2,propandiol; (46.6 grams, 0.612 moles) cyanuric acid (19.2 grams, 0.149 moles) adipic acid (38.4 grams, 0.263 moles) and tetrabutytitanate (0.090 grams) were added to the flask. The gases from the reaction were led through two 1.0N sulfuric acid gas traps, then six barium hydroxide gas traps. The reaction temperature was held at 183 C for 16 hours, then at 215° C. for 8 hours, then at 220 C for 11.5 hours. The reaction product was filtered and applied as a film and baked 0.5 hours on potassium chloride. Infrared spectra taken of the films showed aliphatic isocyanurate bands at 1695 cm-1 and 768 cm-1. (For example see FIG. 7). The volatile basic compound equivalents were determined by back titration of the sulfuric acid solution with 0.1N potassium hydroxide. The carbon dioxide generated was determined gravimetrically based on barium carbonate formation. The carbon dioxide generated amounted to 0.0123 mole and volatile basic compound amounted to 0.0107 equivalents.

EXAMPLES 31-32

In each example, a solution was formed by adding together, in the amounts indicated in Table V, cresylic acid, ethylene glycol, cyanuric acid, terephthalic acid, phenolic resin (877 phenolic produced by P.D. George, Co.) and tetrabutyltitanate. All amounts of reactants are indicated in Table V. The reaction mixtures, thus formed, were sequentially heated to and maintained at the temperatures of 190° C., 192° C., 205° C., 210° C., 214° C., and 220° C., for the times indicated in Table V. Heating of the reaction mixtures was stopped and, an additional amount of cresylic acid (indicated as "Cresylic Acid ( 2nd)") was added as indicated in Table V. When the reaction mixtures reached a temperature of 180° C., phenol (1152.0 grams) was added and the CT Stabil was added when the reaction mixture reached a temperature of 120° C. The temperature was then maintained at a temperature of 120° C. for 0.5 hours. Aromatic solvent (SC-#150 and SC-#100, as sold by Hoosier Solvents and Chemicals Corp.) was then added to the reaction mixture. Cresyl titanate was added when the reaction mixture reached a temperature of 40° C. and the reaction mixture was then maintained at that temperature for 0.5 hours. The reaction mixture was then cooled and filtered.

The distillate had the water and cresylic acid fractions as indicated in Table V. The percentage of solids, and viscosity are indicated in Table V. In Example 32, the reaction product was diluted with a diluting solution of 75 volume percent cresylic acid and 25 volume percent of SC-#150 solvent. The diluted solution had 39.33 percent solids and a viscosity of 730 CPS at about 100° F. as measured by a Brookfield Viscometer.

The resultant wire enamel was applied in six passes to 18 AWG bare copper conductor (having no insulation thereon) employing dies and a conventional wire coating tower, having bank temperatures of 560° F., 710° F., 800° F., and an annealer temperature of 850° F. The properties of the resultant magnet wire and shown in Table VI.

EXAMPLE 33

The reactions were performed in a flask fitted with a motor driven stirrer, a fractionating condenser, thermocouple and nitrogen flush. The flask was connected to 2 gas traps containing 1.73M phosphoric acid. Cresylic acid and urea were added to the flask and maintained, for 4.5 hours at a temperature between 205° C. and 210° C.

The reaction mixture was then cooled to 180° C. and ethylene glycol, terephthalic acid, 877 phenolic, and tetrabutyltitanate were added to the reaction mixture. Amounts of all reactants are indicated in Table VII. The temperature of the reaction mixture was then slowly raised to 193° C. and maintained at that temperature for about 15.25 hours. The temperature of the reaction mixture was then raised to 210° C. and maintained at that temperature for 1 hour. The temperature of the reaction mixture was then raised to 215° C. and maintained at that temperature for 4 hours. The temperature of the reaction mixture was then raised to 218° C. and maintained at that temperature for about 20 hours. Additional cresylic acid (identified in Table VII as "cresylic acid (2nd)") was then added, and the reaction mixture was cooled. When the temperature of the reaction mixture reached 180° C., phenol was added. When the temperature of the reaction mixture reached 120° C, CT Stabil was added and the temperature of the reaction mixture was maintained at about 120° C. for 0.5 hours. When the temperature of the reaction mixture reached 50° C., SC-#150 and Cresyl Titanate were added and the reaction mixture was maintained at a temperature of 50° C. for 0.5 hours. The reaction mixture was then cooled and filtered.

The solution from the gas traps was back titrated with 1.5N potassium hydroxide to determine volatile basic compound equivalent as indicated in Table VII. Water and cresylic acid distillate fractions were collected as indicated in Table VII.

Table VII also discloses percentage solids of the resulting solution and viscosity in cps measured at 100° F. by a Brookfield Viscometer. The resulting solution was then diluted by addition of a diluting solution consisting of 75 volume percent cresylic acid and 25 volume percent of an aromatic solvent (SC-#150 solvent as sold by Hoosier Solvents and Chemicals Corp). The diluted solution had 41.14 percent solids and a viscosity of 1050 CPS measured at 100° F. (Brookfield Viscometer).

The resultant wire enamel was applied in six passes to 18 AWG bare copper conductor (having no insulation thereon) employing dies and a conventional wire coating tower, having bank temperatures of 560° F., 710° F., 800° F., and an annealer temperature of 850° F. The properties of the resultant magnet wire are show in Table VIII.

EXAMPLE 34

Merichem grade 43S cresylic acid, THEIC, terephthalic acid, ethylene glycol, and tetrabutytitanate were added together to form a reaction mixture which was then maintained at a temperature of 200° C. for 15.5 hours. The reaction mixture was then heated to 210° C. and maintained at that temperature for 1 hour. The reaction mixture was then heated to 220° C. and maintained at that temperature for 6 hours. The heating of the reaction mixture was then stopped and additional cresylic acid (identified in Table VII as "cresylic acid(2nd)") was added. Gases from the reaction had been directed through two gas traps containing 1.73M phosphoric acid.

The reaction mixture was then cooled. When the temperature of the reaction mixture reached 180° C., phenol in an amount indicated in Table VII, was added. When the temperature of the reaction mixture reached 120° C., CT Stabil (55.1 grams) was added. The temperature of the reaction mixture was then maintained at 120° C. for 0.5 hours. The reaction mixture was then cooled. When the temperature of the reaction mixture reached 50° C., organic solvent (SC-#150) and cresyl titanate were added in the amounts indicated in Table VII and the reaction mixture was then maintained at a temperature of 50° C. for 0.5 hours. The reaction mixture was then cooled and filtered. Distillate collected had the water fraction and the cresylic acid fraction indicated in Table VII.

The resulting solution of the reaction had 42.28 percent solids and a viscosity of 980 cps at about 100° F. as measured by a Brookfield Viscometer.

The resultant wire enamel was applied in six passes to 18 AWG bare copper conductor (having no insulation thereon) employing dies and a conventional wire coating tower, having bank temperatures of 560° F., 710° F., 800° F. and an annealer temperature of 850° F. The properties of the resulting magnet wire are shown in Table VIII.

EXAMPLES 35-37

In each example, cresylic acid, THEIC, polyethylene terephthalate (ClearTuf 9506B sold by Goodyear Chemicals), Tetrabutyl Tinanate, and SC-#150 were added together to form a reaction mixture. Amounts of all reactants are indicated in Table IX. 877 Phenolic was then added to the reaction mixture and the reaction mixture was heated to 220° C. and maintained at that temperature for about 4.5 hours. Additional cresylic acid (identified as "cresylic acid(2nd)") was then added.

The reaction mixture was then allowed to cool. When the reaction mixture reached a temperature of 180° C. phenol was added. When the reaction mixture reached a temperature of 120° C. CT Stabil, additional solvent consisting of the indicated mixture of SC-#100 and SC-#150 and additional Tetrabutyl Titanate (identified as "Tetrabutyl Titanate(2nd)") were added to the reaction mixture. The reaction mixture was then maintained at 120° C. for 0.5 hours and then cooled to room temperature and filtered. The resulting solutions had the percent solids and viscosities at 100° F. as measured by a Brookfield Viscometer as indicated in Table IX.

The resultant wire enamels were applied in six passes to 18 AWG bare copper conductor (having no insulation thereon) employing dies and a conventional wire coating tower having bank temperatures of 560° F., 710° F., 800° F., and an annealer temperature of 850° F. The properties of the resultant magnet wire are shown in Table X.

EXAMPLE 38

Cresylic acid, polyethylene terephthalate (ClearTuf 9506B sold by Goodyear Chemicals), cyanuric acid, ethylene glycol, SC-#150, Tetrabutyl Titanate, and 877 Phenolic, were added together to form a reaction mixture. The reaction mixture was heated to 194° C. for 1.75 hours, after which time the reaction mixture had stopped evolving water. The temperature of the reaction mixture was then raised to 214° C. and maintained at that temperature for 16 hours. The temperature was then raised to 220° C. and maintained at that temperature for 3 hours. Amounts of all reactants are indicated in Table IX. Additional cresylic acid (identified in Table IX as "cresylic acid(2nd)") was then added to the reaction mixture and the reaction mixture was allowed to cool. When the temperature of the reaction mixture reached 180° C. phenol was added, CT Stabil was added at 120° C. A mixture of SC-#100, SC-#150 and additional Tetrabutyl Titanate (identified in Table IX as "Tetrabutyl Titanate(2nd)" was added to the reaction mixture at 120° C. The reaction mixture was then maintained at a temperature of 120° C. for 0.5 hours. The reaction mixture was then cooled to room temperature and filtered.

The resulting solution had the percentage solids and viscosity as measured at 100° F. on a Brookfield Viscometer as indicated on Table IX.

The resultant wire enamel was applied in six passes to 18 AWG bare copper conductor, employing dies and a conventional wire coating tower having bank temperatures of 560° F., 710° F., 800° F. and an annealer temperature of 850° F. The properties of the resultant magnet wire are shown in Table X.

EXAMPLE 39

Cresylic acid, polyethylene terephthalate, (ClearTuf 9506B sold by Goodyear Chemicals cyanuric acid, ethylene glycol, NJ-150, Tetrabutyl Titanate, and 877 Phenolic were added together to form a reaction mixture. Amounts of reactants are indicated in Table IX.

The reaction mixture was then heated to 192° C. at which time water began evolving. The temperature of the reaction mixture was then slowly increased to 214° C. and maintained at that temperature for 15.25 hours. The temperature of the reaction mixture was then raised to 220° C. and maintained at that temperature for 5 hours. Additional cresylic acid (identified in Table IX as "cresylic acid(2nd)") was then added. The reaction mixture was then allowed to cool. When the temperature of the reaction mixture reached 180° C. phenol was added. When the temperature of the reaction mixture reached 120° C., CT Stabil and a mixture of SC-#100 and SC-#150 and additional Tetrabutyl Titanate (identified in Table IX as "tetrabutyltitanate(2nd)") was added to the reaction mixture. The temperature of the reaction mixture was then maintained at 120° C. for 0.5 hours. The reaction mixture was then cooled and filtered.

The resulting solution had a percent solids and a viscosity at 100° F. as measured by Brookfield Viscometer as indicated in Table IX.

The resultant wire enamel was applied in six passes to 18 AWG bare copper conductor, having no insulation thereon, employing dies and a conventional wire coating tower having bank temperatures of 560° F., 710° C., 800° C., and annealer temperature of 850° F. The properties of the resultant magnet wire are shown in Table X.

Examples 35-39 provide a comparison of isocyanurate containing polyester produced utilizing polyethylene terephthalate and THEIC (Examples 35-37) and alternatively utilizing polyethylene terephthlate and cyanuric acid and ethylene glycol (Examples 38-39).

EXAMPLE 40

Cresylic acid, Flexclad PE 100 as sold by Goodyear Chemicals), cyanuric acid, ethylene glycol, SC-#150, Tetrabutyl Titanate, and 877 Phenolic were added together to form a reaction mixture. Amounts of reactants are indicated in Table IX.

The reaction mixture was then heated to 192° C. at which time water began evolving. The temperature of the reaction mixture was then slowly increased to 214° C. and maintained at that temperature for 15.25 hours. The temperature of the reaction mixture was then raised to 220° C. and maintained at that temperature for 5 hours. Additional cresylic acid (identified in Table IX as "cresylic acid(2nd)") was then added. The reaction mixture was then allowed to cool. When the temperature of the reaction mixture reached 180° C. phenol, was added. When the temperature of the reaction mixture reached 120° C., CT Stabil and a mixture of SC-#100 and SC-#150 and additional Tetrabutyl Titanate identified in Table IX as "Tetrabutyl Titanate (2nd)") was added to the reaction mixture. The temperature of the reaction mixture was then maintained at 120° C. for 0.5 hours. The reaction mixture was then cooled and filtered.

The resulting solution had a percent solids and a viscosity at 100° F. as measured by Brookfield Viscometer as indicated in Table IX.

The resultant wire enamel as applied in six passes to 18 AWG bare copper conductor, having no insulation thereon, employing dies and a conventional wire coating tower having bank temperatures of 560° F., 710° C., 800° C., and an annealer temperature of 850° F. The properties of the resultant magnet wire are shown in Table X.

Example 40 provides a comparison between the polyethylene terephathalate, cyanuric acid and ethylene glycol examples (Examples 35-39) and the polyethylene terephthalate copolymer Flexclad PE 100. Polyethylene terephathalate, its co-polymers having a major number of ester groups therein and mixtures thereof are interchangeable as far as the invention is concerned and can be used in each of the Examples 35-39 with good results.

EXAMPLE 41

Cresylic acid (279.1 g), ethylene glycol (684.1 g), tetrabutyl titanate (1.1 g), cyanuric acid (289.6 g), terephthalic acid (903.2 g), and 877 phenolic (146.3 g) were mixed and heated to 190° C. The temperature was maintained at 190° C. for 15 hours. The temperature was then slowly increased to 212° C. over 6.5 hours. The temperature was maintained at 212° C. for 17.5 hours. The temperature was then maintained at 220° C. for 8 hours. The distillate consisted of 265 ml water fraction and 32 ml cresylic acid fraction. The product was cooled and 386 grams cresylic acid was added. At 180° C., 870.6 grams of phenol was added.

A blocked isocyanate was prepared by mixing cresylic acid (2000.0 g), SC #100 (586.8 g), and 4,4'-Diisocyanate diphenylmethane (999.3 g). 3.8 g of a catalyst (Vanax 808 as sold by R.T. Vanderbilt Company, Inc.,) was added which caused an exotherm to 95° C. The temperature was maintained at 95° C. for 2 hours.

The polyester prepared above (1127.0 g) was mixed with the blocked isocyanate prepared above (1703.7 g). An additional 14.3 g of Vanax 808 was added and mixed well (Solids 38.15%, Viscosity @100° F. 760 cps).

The resultant wire enamel was applied in 6 passes to 18AWG bare copper conductor, having no insulation thereon, employing dies and a conventional wire coating tower having bank temperatures of 560° F., 710° F., 800° F. and an annealer temperature of 850° F. The properties of the resultant magnet wire are shown in Table XI.

Example 41 demonstrates that the magnet wire coating of the invention can be cured by blocked isocyanate reaction with the aliphatic isocyanate containing polyester resins described in this invention. Each of Examples 1-4, 25 and 29-40 can be cured by this mechanism as well as the use of cresyl titanate as exemplified therein.

While there have been described above the principles of this invention in connection with specific reactants, reaction conditions, and the like, it is clearly understood that this description is made only by way of example and not as a limitation to the scope of the invention.

TABLE I

| | All quantities are in grams except those in parentheses which are in moles. | | | |
|---|---|---|---|---|
| Example | 1 | 2 | 3 | 4 |
| Merichem Grade 43S Cresylic Acid | 149.0 | 149.0 | 149.0 | 149.0 |
| Ethylene Glycol | 272.8(4.395) | 86.6(1.395) | 272.8(4.395) | 86.6(1.395) |
| Cyanuric Acid | 129.0(0.999) | — | 129.0(0.999) | — |
| THEIC | — | 261.2(1.000) | — | 261.2(1.000) |
| Terephthalic Acid | 291.9(1.757) | 291.9(1.757) | — | — |
| Dimethyl Terephthalate | — | — | 341.2(1.757) | 341.2(1.757) |
| Dibutyltin Oxide | 1.1 | 1.1 | 1.1 | 1.1 |
| Merichem Grade 43S Cresylic Acid (2nd) | 72.9 | 72.9 | 72.9 | 72.9 |
| Phenol | 353.4 | 353.4 | 353.4 | 353.4 |
| CT Stabil | 39.3 | 39.3 | 39.3 | 39.3 |
| SC Solvent #150 | 189.3 | 189.3 | 189.3 | 189.3 |
| SC Solvent #100 | 63.1 | 63.1 | 63.1 | 63.1 |
| 877 Phenolic | 56.1 | 56.1 | 56.1 | 56.1 |
| Cresyl Titanate | 78.2 | 78.2 | 78.2 | 78.2 |
| Solids | 37.06% | 37.89% | 37.86% | 39.47% |
| Viscosity @ 100° F. | 210 cps | 350 cps | 310 cps | 500 cps |

TABLE II

| Example | 1 | | | 2 | | |
|---|---|---|---|---|---|---|
| Speed (fpm) | 40 | 50 | 60 | 40 | 50 | 60 |
| Surface Coat Quality | Smooth | Smooth | Smooth | Smooth | Smooth | Smooth |
| Build (mils) | 2.9–3.0 | 2.9–3.1 | 3.0–3.1 | 2.9 | 2.9–3.0 | 2.9–3.0 |
| Elongation (%) | 34 | 32 | 30 | 33 | 33 | 32 |
| Mandrel Flex | BP 1X OK | BP 1X OK | BP 1X OK | BP 1X OK | BP 1X OK | BP 1X OK |
| Snap | OK | OK | OK | OK | OK | OK |
| Snap Flex | 1X OK | 1X OK | 1X OK | 1X OK | 1X OK | 1X OK |
| Heat Shock ½ hr 200° C. 20% 3x | Pass | Pass | Pass | Fail | Fail | Fail |
| ½ hr 150° C. 20% 3x | Pass | Pass | Pass | Pass | Pass | Pass |
| Techrand Burnout (ofm) | 3.4 | 4.1 | 3.4 | 3.4 | 4.1 | 3.2 |
| NEMA Cut-Thru (°C.) | 386 | 377 | 245 | 390 | 365 | 357 |
| Dielectric Breakdown (volts) | 11,233 | 10,567 | 9.300 | 10,933 | 11,433 | 10,667 |
| Df 240° C. 1000 Hz | 0.03 | 0.16 | 0.49 | 0.02 | 0.09 | 0.41 |
| Techrand Windability | 10 | 14 | 12 | 13 | 14 | 16 |
| Unidirectional Scrape (1000 g) | 1,810 | 1,730 | 1,690 | 1,680 | 1,700 | 1,650 |
| Slit Twist | 63 | 64 | 67 | 55 | 60 | 61 |

| Example | 3 | | | 4 | | |
|---|---|---|---|---|---|---|
| Speed (fpm) | 40 | 50 | 60 | 40 | 50 | 60 |
| Surface Coat Quality | Smooth | Smooth | Smooth | Smooth | Smooth | Smooth |
| Build (mils) | 2.8–3.0 | 2.9–3.1 | 3.0–3.1 | 3.1–3.3 | 3.0–3.3 | 3.1–3.2 |
| Elongation (%) | 35 | 33 | 33 | 36 | 33 | 35 |
| Mandrel Flex | 30% 1X OK | 30% 1X OK | BP 1X OK | BP 1X OK | BP 1X OK | 30% 1X OK |
| Snap | OK | OK | OK | OK | OK | Fail |
| Snap Flex | 1X OK | 2X OK | 2X OK | 1X OK | 2X OK | Fail |
| Heat Shock ½ hr 200° C. 20% 3x | Fail | Fail | Fail | Fail | Fail | — |
| ½ hr 150° C. 20% 3x | Pass | Pass | Pass | Pass | Pass | — |
| Techrand Burnout (ofm) | 3.6 | 3.3 | 3.4 | 3.8 | 3.5 | — |
| NEMA Cut-Thru (°C.) | 381 | 381 | 377 | 403 | 337 | — |
| Dielectric Breakdown (volts) | 11,433 | 10,233 | 8,900 | 12,700 | 11,467 | — |
| Df 240° C. 1000 Hz | 0.02 | 0.15 | 0.30 | 0.02 | 0.06 | — |
| Techrand Windability | 16 | 16 | 12 | 16 | 18 | — |
| Unidirectional Scrape (1000 g) | 1,540 | 1,820 | 1,530 | 1,780 | 1,810 | — |
| Slit Twist | 58 | 55 | 60 | 51 | 64 | — |

TABLE III

All quantities are in moles except where otherwise indicated.

| Example | 5 | 6 | 7 | 8 |
|---|---|---|---|---|
| Ethylene Gycol | 0.438 | 0.438 | 0.288 | 0.069 |
| Cyanuric Acid | 0.050 | — | — | — |
| THEIC | — | 0.050 | 0.050 | 0.050 |
| Adipic Acid | 0.088 | 0.088 | 0.088 | 0.088 |
| Dibutyltin Oxide (g) | 0.050 | 0.050 | 0.050 | 0.050 |
| Merichem Grade 43S Cresylic Acid(g) | — | — | — | 7.5 |
| CO$_2$ | 0.00673 | 0.150 | 0.148 | 0.00189 |
| Volatile Basic Compound (eq) | 0.00590 | 0.00269 | 0.00184 | 0.0000 |

TABLE IV

| Example | Ethylene Glycol Cyanuric Acid (mole/mole) | Adipic Acid Cyanuric Acid (mole/mole) | CO2 Cyanuric Acid (mole/mole) | Basic Compound Cyanuric Acid (equivalent/mole) |
|---|---|---|---|---|
| 9 | 8.835 | 2.409 | 0.185 | 0.198 |
| 10 | 8.835 | 1.780 | 0.135 | 0.119 |
| 11 | 8.835 | 1.324 | 0.274 | 0.230 |
| 12 | 8.835 | 1.103 | 0.341 | 0.268 |
| 13 | 8.835 | 0.883 | 1.421 | 0.274 |
| 14 | 8.835 | 0.552 | 1.950 | 0.375 |
| 15 | 8.835 | 0.179 | 2.010 | 0.621 |
| 16 | 8.835 | 0 | 2.024 | 1.232 |
| 17 | 5.782 | 1.780 | 0.101 | 0.056 |
| 18 | 5.782 | 0.883 | 0.240 | 0.226 |
| 19 | 5.782 | 0.552 | 0.347 | 0.236 |
| 20 | 5.782 | 0.179 | 1.591 | 0.405 |
| 21 | 5.782 | 0 | 1.907 | 1.160 |
| 22 | 3.637 | 0.179 | 0.272 | 0.196 |
| 23 | 3.637 | 0.092 | 0.978 | 0.476 |
| 24 | 3.637 | 0 | 0.746 | 0.540 |

TABLE V

All quantities are in grams except where indicated otherwise

| Example | 31 | 32 |
|---|---|---|
| Cresylic acid Merichem Grade 43 S | 485.8 | 727.4 |
| Ethylene Glycol | 933.1 | 933.1 |
| Cyanuric Acid | 505.0 | 505.0 |
| Terephthalic Acid | 951.5 | 951.5 |
| 877 Phenolic | 183.1 | 183.1 |
| Tetrabutyl Titanate | 2.0 | 2.0 |
| Cresylic acid (2nd) Merichem Grade 43 S | 241.6 | — |
| Phenol | 1152.0 | 1152.0 |
| CT Stabil | 128.0 | 128.0 |
| SC Solvent # 150 | 617.2 | 617.2 |
| SC Solvent # 100 | 205.8 | 205.8 |
| Cresyl Titanate | 248.9 | 248.9 |
| Time Maintained At | | |

TABLE V-continued

All quantities are in grams except where indicated otherwise

| Example | 31 | 32 |
|---|---|---|
| 190° C. | 2 hrs. | .75 hrs. |
| 192° C. | 18 hrs. | 18.25 hrs. |
| 205° C. | 3.75 hrs. | 5 hrs. |
| 210° C. | 7 hrs. | 5 hrs. |
| 214° C. | 15 hrs. | 15.45 hrs. |
| 220° C. | 3 hrs. | 3 hrs. |
| Distillate Fractions | | |
| Water | 380 ml. | 412 ml. |
| Cresylic Acid | 34 ml. | 68 ml. |
| Percent Solids | 39.85% | 40.71% |
| Viscosity @ 100° F. | 600 cps | 980 cps |

TABLE VI

| Example | 31 | | | | |
|---|---|---|---|---|---|
| Speed (fpm) | 45 | 50 | 55 | 60 | 65 |
| Surface Coat Quality | Smooth | Smooth | Smooth | Smooth | Smooth |
| Build (mils) | 3.0 | 3.0 | 3.0 | 3.0 | 3.0-3.1 |
| Elongation (%) | 40 | 39 | 38 | 39 | 39 |
| Mandrel Flex | BP 1X OK | BP 1X OK | BP 1X OK | BP 1X OK | BP 1X OK |
| Snap | OK | OK | OK | OK | OK |
| Snap Flex | 1X OK | 1X OK | 1X OK | 1X OK | 1X OK |
| Heat Shock ½ hr 20° C. 20% 3x | Pass | Pass | Pass | Pass | Fail |
| Techrand Burnout (ofm) | 5.9 | — | 5.5 | — | 5.6 |
| NEMA Cut-Thru (°C.) | — | — | 359 | — | 217 |
| Dielectric Breakdown (volts) | 14,067 | 13,400 | 13,233 | 12,900 | 13,950 |
| Df 240° C. 1000 Hz | 0.03 | 0.05 | 0.08 | 0.16 | 0.40 |
| Example | 32 | | | | |
| Speed (fpm) | 45 | 50 | 55 | 60 | 65 |
| Surface Coat Quality | Smooth | Smooth | Smooth | Smooth | Smooth |
| Build (mils) | 3.0 | 3.0 | 3.0 | 3.0 | 3.0 |
| Elongation (%) | 39 | 40 | 40 | 39 | 39 |
| Mandrel Flex | BP 1X OK | BP 1X | OK BP 1X | OK BP 1X | OK BP 1X |
| Snap | OK | OK | OK | OK | OK |
| Snap Flex | 1X OK | 1X OK | 1X OK | 1X OK | 1X OK |
| Heat Shock ½ hr 20° C. 20% 3x | Pass | Pass | Pass | Pass | Fail |
| Techrand Burnout (ofm) | 5.7 | — | 5.4 | — | 5.4 |
| NEMA Cut-Thru (°C.) | — | — | 367 | — | 248 |
| Dielectric Breakdown (volts) | 14,500 | 14,033 | 13,933 | 13,633 | 12,133 |
| Df 240° C. 1000 Hz | 0.03 | 0.05 | 0.09 | 0.17 | 0.31 |

TABLE VII

All quantities are in grams unless otherwise indicated

| Examples | 33 | 34 |
|---|---|---|
| Cresylic Acid Merichem Grade 43S | 274.6 | 274.6 |
| Urea | 274.6 | — |
| THEIC grams (moles) | — | 366.3 (1.902) |
| Ethylene Glycol grams (moles) | 382.7 | 121.6 (1.960) |
| Terephthalic Acid | 409.6 | 409.6 |
| 877 Phenolic | 78.7 | 78.7 |
| Tetrabutyltitanate | 0.8 | 0.8 |
| Cresylic Acid (2nd) Merichem Grade 43S | 105 | 100 |
| Phenol | 430 | 412 |
| CT Stabil | 55.1 | 55.1 |
| NJ-150 | 250 | 188 |
| Cresyl Titanate | 107.3 | 107.3 |
| Violatile Basic Compound | 3.938 Equiv. | — |
| Equivalents Distillate | | |
| Water Fraction | 132 ml. | 80 ml. |
| Cresyl Acid Fraction | 20 ml. | 8 ml. |
| Percent Solids | 42.67% | 42.28% |
| Viscosity @ 100° F. | 1230 cps. | 980 cps. |

TABLE VIII

| Example | 33 | | | | |
|---|---|---|---|---|---|
| Speed (fpm) | 40 | 45 | 50 | 55 | 60 |
| Surface Coat Quality | slight roughness | slight roughness | slight roughness | slight roughness | slight roughness |
| Build (mils) | 3.3-3.4 | 3.0-3.5 | 3.1-3.4 | 3.2-3.4 | 3.1-3.5 |
| Elongation (%) | 39 | 38 | 39 | 38 | 39 |
| Mandrel Flex | BP 1X OK | BP 1X OK | BP 1X OK | BP 1X OK | BP 1X OK |
| Snap | OK | OK | OK | OK | OK |
| Snap Flex | 1X OK | 1X OK | 1X OK | 1X OK | 1X OK |
| Heat Shock ½ hr 200° C. 20% 3x | Fail | Pass | Pass | Pass | Pass |
| Techrand Burnout (ofm) | — | — | 6.0 | — | — |
| NEMA Cut-Thru (°C.) | — | — | 370 | — | — |
| Dielectric Breakdown (volts) | 13,567 | 13,367 | 12,133 | 11,567 | 11,600 |
| Df 240° C. 1000 Hz | 0.02 | 0.04 | 0.12 | 0.23 | 0.27 |
| Techrand Windability | — | — | 27-24-27 | — | — |
| Unidirectional Scrape (1000 g) | 1,450 | 1,320 | 1,410 | 1,260 | 1,240 |
| Slit Twist | 59 | 61 | 61 | 61 | 62 |
| Example | 34 | | | | |
| Speed (fpm) | 40 | 45 | 50 | 55 | 60 |
| Surface Coat Quality | slight roughness | slight roughness | slight roughness | slight roughness | slight roughness |
| Build (mils) | 3.2-3.4 | 3.2 | 3.2-3.3 | 3.2-3.3 | 3.3 |
| Elongation (%) | 39 | 39 | 39 | 38 | 39 |

TABLE VIII-continued

| | | | | | |
|---|---|---|---|---|---|
| Mandrel Flex | 35% 1X OK | BP 1X OK | BP 1X OK | BP 1X OK | BP 1X OK |
| Snap | OK | OK | OK | OK | OK |
| Snap Flex | 1X OK | 1X OK | 1X OK | 1X OK | 1X OK |
| Heat Shock ½ hr 200° C. 20% 3x | Fail | Pass | Pass | Pass | Pass |
| Techrand Burnout (ofm) | — | — | 5.9 | — | — |
| NEMA Cut-Thru (°C.) | — | — | 375 | — | — |
| Dielectric Breakdown (volts) | 12,100 | 12,467 | 12,167 | 12,633 | 12,400 |
| Df 240° C. 1000 Hz | 0.01 | 0.04 | 0.09 | 0.20 | 0.21 |
| Techrand Windability | — | — | 22 | — | — |
| Unidirectional Scrape (1000 g) | 1,250 | 1,260 | 1,290 | 1,490 | 1,360 |
| Slit Twist | 57 | 62 | 68 | 70 | 73 |

TABLE IX

All quantities are in grams except those in parentheses which are in moles.

| Example | 35 | 36 | 37 | 38 | 39 | 40 |
|---|---|---|---|---|---|---|
| Cresylic Acid Merichem Grade 43S | 157.5 | 157.5 | 157.5 | 157.5 | 157.5 | 157.5 |
| Polyethylene Terephthalate (9506B) | 356.7 | 356.7 | 356.7 | 356.7 | 356.7 | — |
| Flexclad PE-100 Goodyear Chemicals | — | — | — | — | — | 356.7 |
| THEIC | 275.7 | 322.1 | 275.7 | — | — | — |
| Cyanuric Acid | — | — | — | 136.3 | 163.5 | 163.5 |
| Ethylene Glycol | — | — | — | 166.6 | 187 | 187 |
| NJ-150 | 6 | 6 | 6 | 6 | 6 | 6 |
| Tetrabutyl Titanate | 1.3 | 1.3 | 1.3 | 1.3 | 1.3 | 1.3 |
| Cresylic Acid (2nd) Merichem Grade 43S | 133 | 133 | 133 | 133 | 133 | 133 |
| 877 Phenolic | 59.4 | 59.4 | 59.4 | 59.4 | 59.4 | 59.4 |
| Phenol | 373.1 | 373.1 | 373.1 | 373.1 | 373.1 | 373.1 |
| CT Stabil | 41.6 | 41.6 | 62.4 | 41.6 | 41.6 | 41.6 |
| NJ-100/NJ-150 | 66.7/200.9 | 66.7/200.9 | 66.7/200.9 | 66.7/200.9 | 66.7/200.9 | 66.7/200.9 |
| Tetrabutyl Titanate (2nd) | 25.6 | 25.6 | 25.6 | 25.6 | 25.6 | 25.6 |
| Solids (%) | 37.5 | 39.23 | 38.6 | 38.5 | 39.9 | 39.3 |
| Viscosity (CPS) @ 100° F. | 235 | 335 | 340 | 420 | 875 | 540 |

TABLE X

| Example | 35 | | | | | | 36 | | | | | | 37 | |
|---|---|---|---|---|---|---|---|---|---|---|---|---|---|---|
| Speed (fpm) | 45 | 50 | 55 | 60 | 65 | 50 | 45 | 55 | 60 | 65 | 45 | 50 | 50 | 55 |
| Surface Coat Quality | | | Exceptionally good coatability | | | Smooth | | Exceptionally smooth | | | | | Smooth | |
| Build (mils) | 3.0 | 3.0 | 3.0–3.1 | 3.0–3.1 | 3.0–3.2 | 3.0 | 2.8–3.0 | 3.0–3.1 | 3.0–3.2 | 3.0–3.2 | 2.8–3.0 | 2.8–3.0 | 2.8–3.0 | 2.8–3.1 |
| Elongation (%) | 40 | 40 | 40 | 40 | 39 | 40 | 40 | 40 | 40 | 40 | 40 | 40 | 40 | 40 |
| Mandrel Flex | BP 1X OK | BP 1X OK | BP 1X OK | BP 1X OK | BP 1X OK | BP 1X OK | BP 1X OK | BP 1X OK | BP 1X OK | BP 1X OK | BP 1X OK | BP 1X OK | BP 1X OK | BP 1X OK |
| Snap | OK | OK | OK | OK | OK | OK | OK | OK | OK | Fails-Tubes | OK | OK | OK | OK |
| Snap Flex | 1X OK | 1X OK | 1X OK | 1X OK | 1X OK | 1X OK | 1X OK | 1X OK | 1X OK | — | 1X OK | 1X OK | 1X OK | 1X OK |
| Heat Shock 200° C. 20% 3x | Pass | Pass | Pass | Pass | Pass | Pass | Pass | Pass | Fail | Fail | Pass | Pass | Pass | Pass |
| Techrand Burnout (ofm) | 6.1 | — | 5.9 | — | 6.0 | 5.7 | 5.7 | 5.4 | — | — | 5.7 | — | — | 5.9 |
| NEMA Cut-Thru (°C.) | 329 | — | 293 | — | 195 | 331 | 362 | 305 | — | 185 | 331 | — | — | 331 |
| Dielectric Breakdown (volts) | 14,900 | 15,100 | 15,000 | 14,000 | 13,100 | 14,900 | 13,100 | 13,500 | 13,100 | 13,300 | 13,100 | 13,900 | 13,900 | 13,200 |
| Unidirectional Scrape | 1430 | 1370 | 1410 | 1290 | 1290 | 1400 | 1440 | 1300 | 1280 | — | 1440 | 1420 | 1420 | 1370 |
| Unidirectional Scrape (1000 g) | | | | | | | | | | | | | | |
| Techrand Windability | 23 | — | 23 | — | 20 | 21 | 22 | 24 | — | — | 22 | — | — | 23 |
| Df 240° C. 1000 Hz | .05 | .12 | .23 | .41 | .90 | .05 | .08 | .23 | .48 | 1.05 | .08 | .16 | .16 | .29 |
| Tg °C. | 138.9 | | | 139.4 | | 141.8 | 139.2 | | | | 139.2 | | | |

| Example | 37 | | | | | | 38 | | | | | | 39 | |
|---|---|---|---|---|---|---|---|---|---|---|---|---|---|---|
| Speed (fpm) | 45 | 50 | 55 | 60 | 65 | 45 | 50 | 55 | 60 | 65 | 45 | 50 | 55 | 60 |
| Surface Coat Quality | | Smooth | | | | | | Exceptionally smooth | | | | | | |
| Build (mils) | 2.8–3.1 | 2.8–3.1 | 3.0–3.0 | 2.9–3.0 | 3.0–3.1 | 2.9–3.0 | 3.0–3.2 | 3.0–3.1 | 3.0–3.1 | 3.0–3.2 | 3.1 | 3.1–3.2 | 3.1–3.2 | 3.1–3.29 |
| Elongation (%) | 40 | 40 | 40 | 40 | 40 | 40 | 40 | 40 | 40 | 39 | 40 | 40 | 40 | 40 |
| Mandrel Flex | BP 1X OK | BP 1X OK | BP 1X OK | BP 1X OK | BP 1X OK | BP 1X OK | BP 1X OK | BP 1X OK | BP 1X OK | BP 1X OK | BP 1X OK | BP 1X OK | BP 1X OK | BP 1X OK |
| Snap | OK | OK | OK | OK | OK | OK | OK | OK | OK | OK | OK | OK | OK | OK |
| Snap Flex | 1X OK | 1X OK | 1X OK | 1X OK | 1X OK | 1X OK | 1X OK | 1X OK | 1X OK | 1X OK | 1X OK | 1X OK | 1X OK | 1X OK |
| Heat Shock 200° C. 20% 3x | Fail | Pass | Pass | Pass | Pass | Pass | Pass | Pass | Pass | Pass | Pass | Pass | Pass | Pass |
| Techrand Burnout (ofm) | — | 5.8 | 6.3 | — | 6.2 | — | — | 6.3 | — | 5.6 | 6.1 | 6.3 | 6.3 | — |
| NFMA Cut-Thru (°C.) | — | 220 | 367 | — | 352 | — | — | 377 | — | 211 | 369 | 229 | 229 | — |
| Dielectric Breakdown | 13,000 | 13,000 | 13,300 | 15,300 | 14,800 | 14,900 | 15,300 | 15,900 | 15,700 | 13,700 | 15,100 | 15,000 | 15,000 | 13,600 |
| Unidirectional Scrape (gms) | 1360 | 1350 | 1420 | 1400 | 1280 | 1360 | 1400 | 1390 | 1350 | 1220 | 1310 | 1270 | 1270 | 1320 |
| Techrand Windability | — | 21 | 21 | — | 25 | 21 | — | 23 | — | 21 | 27 | 25 | 25 | — |
| Df 240° C. 1000 Hz | .05 | 1.1 | .04 | .09 | .18 | .05 | .30 | .03 | .06 | .59 | .09 | .38 | .38 | .17 |
| Tg °C. | | | | 139.4 | | | | | 147.3 | | | | | |

| Example | | | 40 | | | |
|---|---|---|---|---|---|---|
| Speed (fpm) | 50 | 55 | 60 | 65 | | |
| Surface Coat Quality | | Exceptionally smooth | | | | |
| Build (mils) | 2.9–3.0 | 2.9–3.0 | 3.0–3.2 | 3.0–3.1 | | |
| Elongation (%) | 38 | 38 | 37 | 36 | | |
| Mandrel Flex | BP1X OK | BP1X OK | BP1X OK | BP1X OK | | |
| Snap | OK | OK | OK | OK | | |
| Snap Flex | 1X OK | 1X OK | 1X OK | 1X OK | | |

TABLE X-continued

| | | | | |
|---|---|---|---|---|
| Heat Shock 200° C. 20% 3X | Pass | Pass | Pass | Pass |
| Techrand Burnout (ofm) | — | 5.5 | — | 5.8 |
| NFMA Cut-thru (°C.) | 376 | 292 | 232 | 219 |
| Dielectric Breakdown | — | — | — | — |
| Undirectional Scrape (gms) | — | — | — | — |
| Undirectional Scrape (1000 g) | — | — | — | — |
| Techrand Windability | — | — | — | — |
| Df 240° C. 1000 Hz | .07 | .15 | .28 | .68 |
| Tg °C. | | 131.1 | | |

TABLE XI
EXAMPLE 41

| Speed (fpm) | 45 | 50 | 55 | 60 | 65 |
|---|---|---|---|---|---|
| Surface Coat Quality | Smooth | Smooth | Smooth | Smooth | Smooth |
| Build (mils) | 2.6 | 2.7 | 2.7-2.8 | 2.8-2.9 | 2.8-2.9 |
| Elongation (%) | 35 | 36 | 36 | 35 | 36 |
| Mandrel Flex | BPIXOK | BPIXOK | BPIXOK | BPIXOK | BPIXOK |
| Snap | OK | OK | OK | OK | OK |
| Snap Flex | 1X OK | 1X OK | 1X OK | 1X OK | 1X OK |
| Techrand Burnout (ofm) | | | 4.7 | | |
| NFMA Cut-thru (°C.) | 286 | | 273 | | 259 |
| Dielectric Breakdown | 11,850 | 13,560 | 11,040 | 12,210 | 12,470 |
| Unidirectional Scrape (1000 g) | 1760 | 1780 | 1760 | 1700 | 1730 |
| Slit Twist | 77 | 84 | 84 | 82 | 86 |

What is claimed is:

1. An improved composition of matter comprising the reaction product of a cyanuric acid reactant, an aliphatic vicinal diol and a carboxyl reactant.

2. The improved composition of matter of claim 1 wherein said carboxyl reactant is selected from the group consisting of dicarboxylic acids, esters of dicarboxylic acids, half-esters of dicarboxylic acids, polyester polymers and combinations thereof.

3. The improved composition of matter of claim 1 wherein said carboxyl reactant is selected from the group consisting of orthophthalic acid, isophthalic acid, terephthalic acid, adipic acid, azelaic acid, itaconic acid, dodecanedioic acid, esters of said acids, half-esters of said acids, and combinations thereof.

4. The improved composition of claim 1 wherein said aliphatic vicinal diol is selected from the group consisting of ethylene glycol, 1,2 propanediol, glycerol, 1,2 butanediol, D-galactose, D-gluconic acid, D-tartaric acid, L-tartaric acid, dimethyl D-tartrate, dimethyl L-tartrate, polyester polymers and combinations thereof.

5. The improved composition of matter of claim 1 wherein at least a portion of said aliphatic vicinal diol reactant and at least a portion of said carboxyl group reactant is supplied by polymers chosen from the group consisting of polyethylene terephthalate, its polyester co-polymers, and mixtures thereof.

6. The improved composition of matter of claim 1 wherein said cyanuric acid reactant is a reaction product of urea.

7. The improved composition of matter of claim 1 further comprising a cosolvent selected from the group consisting of phenolic solvents and combinations thereof.

8. The improved composition of matter of claim 1 wherein said reaction product is reacted within a temperature range between about 195° C. and about 220° C.

9. The improved composition of matter of claim 1 further comprising phenolic resin in said reaction product.

10. The improved composition of matter of claim 9 wherein said phenolic resin is selected from the group consisting of resins prepared from m,p-cresol and formaldehyde.

11. The improved composition of matter of claim 9 wherein said phenolic resin is between about 0.5 weight percent and about 15 weight percent based on total weight of said reaction product.

12. The improved composition of matter of claim 1 further comprising blocked polyisocyanate in said reaction product.

13. The improved composition of matter of claim 12 wherein said blocked polyisocyanate is between 0.5 weight percent and about 200 weight percent based on total weight of said reaction product.

14. The improved composition of matter of claim 12 wherein said blocked polyisocyanate has at least two isocyanate groups in the urethane form.

15. The improved composition of matter of claim 1 further comprising titanate in said reaction product.

16. The improved composition of matter of claim 15 wherein said titanate is of the group consisting of tetra butyl titanate, tetra isopropyl titanate, cresyl titanate and combinations thereof.

17. The improved composition of matter of claim 16 wherein said titanate is between about 0.01 weight percent and about 5 weight percent of titanium metal based on total reaction product weight.

18. The improved composition of claim 1 applied as a coating on an elongated filament.

19. A magnet wire comprising a conductor having a coating of an isocyanurate containing polyester superimposed thereon, said coating being a reaction product of a cyanuric acid reactant, an aliphatic vicinal diol and a carboxyl reactant.

20. The magnet wire of claim 19 wherein said carboxyl reactant is selected from the group consisting of dicarboxylic acids, esters of dicarboxylic acids, half-esters of dicarboxylic acids, polyester polymers and combinations thereof.

21. The magnet wire of claim 19 wherein said carboxyl reactant is selected from the group consisting of orthophthalic acid, isophthalic acid, terephthalic acid, adipic acid, azelaic acid, itaconic acid, dodecanedioic acid, esters of said acids, half-esters of said acids, and combinations thereof.

22. The magnet wire of claim 19 wherein said aliphatic vicinal diol is selected from the group consisting of ethylene glycol, 1,2 propane diol, glycerol, 1,2 butane diol, D-galactose, D-glucose acid, D-tartaric acid, L-tartaric acid, dimethyl D-tartrate, dimethyl L-tartrate, polyester polymers and combinations thereof.

23. The magnet wire of claim 19 wherein at least a portion of said aliphatic vicinal diol reactant and at least a portion of said carboxyl group reactant is supplied by polymers chosen from the group consisting of polyethylene terephthalate, its polyester co-polymers and combinations thereof.

24. The magnet wire of claim 19 wherein said cyanuric acid reactant is a reaction product of urea.

25. The magnet wire of claim 19 further comprising a cosolvent selected from the group consisting of phenolic solvents and combinations thereof.

26. The magnet wire of claim 19 wherein said reaction product is reacted within a temperature range between about 195° C. and about 220° C.

27. The magnet wire of claim 19 further comprising phenolic resin in said reaction product.

28. The magnet wire of claim 19 wherein said phenolic resin is selected from the group consisting of resins prepared from m,p-cresol and formaldehyde.

29. The magnet wire of claim 19 wherein said phenolic resin is between about 0.5 weight percent and about 15 weight percent based on total weight of said reaction product.

30. The magnet wire of claim 19 further comprising blocked polyisocyanate in said reaction product.

31. The magnet wire of claim 19 wherein said blocked polyisocyanate is between about 0.5 weight percent and about 200 weight percent based on total weight of said reaction product.

32. The magnet wire of claim 19 wherein said blocked polyisocyanate has at least two isocyanate groups in the urethane form.

33. The magnet wire of claim 19 further comprising titanate in said reaction product.

34. The magnet wire of claim 19 wherein said titanate is of the group consisting of tetra butyl titanate, tetra isopropyl titanate, cresyl titanate and combinations thereof.

35. The magnet wire of claim 19 wherein said titanate is between about 0.01 weight percent and about 5 weight percent of titanium metal based on total reaction product weight.

36. A method for preparing an improved composition of matter comprising the steps of blending a cyanuric acid reactant, an aliphatic vicinal diol reactant, and a carboxyl reactant, to form a reaction mixture, reacting said reactant mixture at an elevated temperature.

37. The method of claim 36 further comprising the step of adding phenolic resin.

38. The method of claim 36 wherein said carboxyl reactant is of the group consisting of dicarboxylic acids, esters of dicarboxylic acids, half-esters of dicarboxylic acids, polyester polymers and combinations thereof.

39. The method of claim 36 wherein said carboxyl reactant is of the group consisting of orthophthalic acid, isophthalic acid, terephthalic acid, adipic acid, azelaic acid, itaconic acid, dodecanedioic acid, esters of said dicarboxylic acids, half-esters of said dicarboxylic acids, and combinations thereof.

40. The method of claim 36 wherein said hydroxyl group containing reactant is of the group consisting of ethylene glycol, 1,2 propanediol, glycerol, 1,2 butanediol, D-galactose, D-gluconic acid, D-tartaric acid, L-tartaric acid, dimethyl D-tartarate, dimethyl L-tartarate, polyester polymers and combinations thereof.

41. The method of claim 36 wherein said cyanuric acid reactant is a reaction product of urea.

42. The method of claim 36 further comprising cosolvent selected from the group consisting of phenolic solvents and combinations thereof.

43. The improved method of claim 36 wherein at least a portion of said aliphatic vicinal diol reactant and at least a portion of said carboxyl group reactant is supplied by polymers chosen from the group consisting of polyethylene terephthalate, its polyester co-polymers, and mixtures thereof.

44. The improved method of claim 36 wherein said reaction product is reacted within a temperature range between about 195° C. and about 220° C.

45. The improved method of claim 36 further comprising phenolic resin in said reaction product.

46. The improved method of claim 36 wherein said phenolic resin is selected from the group consisting of resins prepared from m,p-cresol and formaldehyde.

47. The improved method of claim 36 wherein said phenolic resin is between about 0.5 weight percent and about 15 weight percent based on total weight of said reaction product.

48. The method of claim 36 further comprising the step of adding blocked polyisocyanate.

49. The improved method of claim 36 wherein said blocked polyisocyanate is between 0.5 weight percent and about 200 weight percent based on total weight of said reaction product.

50. The improved method of claim 36 wherein said blocked polyisocyanate has at least two isocyanate groups in the urethane form.

51. The method of claim 36 further comprising the step of adding titanate.

52. The improved method of claim 36 wherein said titanate is of the group consisting of tetra butyl titanate, tetra isopropyl titanate, cresyl titanate and combinations thereof.

53. The improved method of claim 36 wherein said titanate is between about 0.01 weight percent and about 5 weight percent of titanium metal based on total reaction product weight.

54. A rotating electromagnetic device having a winding of conductive elements, each of said elements having a conductor and a coating of an isocyanurate containing polyester thereon, said coating being a reaction product of a cyanuric acid reactant, an aliphatic vicinal diol, and a carboxyl and reactant.

55. The device of claim 54 wherein said carboxyl reactant is selected from the group consisting of dicarboxylic acids, esters of dicarboxylic acids, half-esters of dicarboxylic acids, polyester polymers and combinations thereof.

56. The device of claim 54 wherein said carboxyl reactant is selected from the group consisting of othophthalic acid, isophthalic acid, terephthalic acid, adipic acid, azelaic acid, itaconic acid, dodecanedioic acid, esters of said acids, and half-esters of said acids, and combinations thereof.

57. The device of claim 54 wherein said aliphatic vicinal diol is selected from the group consisting of ethylene glycol, 1,2 propane diol glycerol, 1,2 butane diol, D-galactose, D-glucose acid, D-tartaric acid, L-tartaric acid, dimethyl D-tartrate, dimethyl L-tartrate polyester polymers and combinations thereof.

58. The device of claim 54 wherein at least a portion of said aliphatic vicinal diol reactant and at least a portion of said carboxyl group reactant is supplied by reactants of the group consisting of polyethylene terephthalate, its polyester co-polymers, and combinations thereof.

59. The device of claim 54 wherein said cyanuric acid reactant is a reaction product of urea.

60. The device of claim 54 further comprising a cosolvent selected from the group consisting of phenolic solvents and combinations thereof.

61. The improved composition of matter of claim 54 wherein said reaction product is reacted within a temperature range between about 195° C. and about 220° C.

62. The device of claim 54 further comprising phenolic resin in said reaction product.

63. The device of claim 62 wherein said phenolic resin is selected from the group consisting of resins prepared from m,p-cresol and formaldehyde.

64. The device of claim 62 wherein said phenolic resin is between about 0.5 weight percent and about 15 weight percent based on total weight of said reaction product weight.

65. The device of claim 54 further comprising blocked polyisocyanate in said reaction product.

66. The device of claim 65 wherein said blocked polyisocyanate is between about 0.5 weight percent and about 200 weight percent based on total weight of said reaction product.

67. The device of claim 65 wherein said blocked polyisocyanate has at least two isocyanate groups in the urethane form.

68. The device of claim 54 further comprising titanate in said reaction product.

69. The device of claim 68 wherein said titanate is of the group consisting of tetra butyl titanate, tetra isopropyl titanate, cresyl titanate and combinations thereof.

70. The device of claim 68 wherein said titanate is between about 0.01 weight percent and about 5 weight percent of titanium metal based on total reaction product weight.

* * * * *